(12) United States Patent
Skurich et al.

(10) Patent No.: US 8,453,693 B2
(45) Date of Patent: *Jun. 4, 2013

(54) PNEUMATIC TIRE

(75) Inventors: Michael Stefan Skurich, Canton, OH (US); Lisa Marie Missik-Gaffney, North Jackson, OH (US); David Ray Hubbell, Hartville, OH (US); Teresa Diane Martter, Akron, OH (US); George Frank Balogh, North Canton, OH (US); Arthur Allen Goldstein, Mayfield Village, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 269 days.

This patent is subject to a terminal disclaimer.

(21) Appl. No.: 12/621,010

(22) Filed: Nov. 18, 2009

(65) Prior Publication Data

US 2011/0114240 A1 May 19, 2011

(51) Int. Cl.
*B60C 15/00* (2006.01)
*B60C 15/06* (2006.01)
*B60C 1/00* (2006.01)
*B60C 11/00* (2006.01)

(52) U.S. Cl.
USPC ........... 152/539; 152/541; 152/546; 152/547; 152/555; 152/209.5

(58) Field of Classification Search
USPC ........................................................ 152/555
See application file for complete search history.

(56) References Cited

U.S. PATENT DOCUMENTS

| | | | |
|---|---|---|---|
| 4,635,693 A | 1/1987 | Ahagon et al. ............... 125/209 |
| 5,174,838 A * | 12/1992 | Sandstrom et al. ......... 152/209.5 |
| 6,070,630 A * | 6/2000 | Pompei et al. ............. 152/152.1 |
| 6,959,743 B2 | 11/2005 | Sandstrom ................. 152/209.5 |
| 7,060,146 B2 * | 6/2006 | Ikeda et al. ................ 156/130.7 |
| 2007/0137745 A1 | 6/2007 | Lukich et al. ............. 152/209.5 |
| 2008/0066839 A1 | 3/2008 | Sandstrom et al. ........ 152/209.5 |
| 2008/0066840 A1 | 3/2008 | Sandstrom et al. ........ 152/209.5 |
| 2009/0151845 A1 | 6/2009 | Skurich et al. ............... 152/546 |

FOREIGN PATENT DOCUMENTS

| | | |
|---|---|---|
| EP | 0560182 A1 | 9/1993 |
| EP | 1310385  * | 5/2003 |
| EP | 1431078 A1 | 6/2004 |
| GB | 2058687 A | 4/1981 |

* cited by examiner

*Primary Examiner* — Justin Fischer
(74) *Attorney, Agent, or Firm* — John D. DeLong

(57) ABSTRACT

A pneumatic radial tire having a circumferentially extending equatorial plane of the tire, the tire comprising a carcass, a tread radially outward of the carcass, the carcass comprising at least one carcass reinforcing ply, opposing bead portions, and opposing sidewalls, the carcass reinforcing ply having a main portion extending between the opposing bead portions and a pair of turnup portions, each turnup portion extending from one end of the main portion, each bead portion having a bead core, and a reinforcement cavity outward of each bead core, the cavity located between the main portion and one turnup portion of the at least one reinforcing ply, the tire characterized by:

the tread comprising a radially outer tread cap and a radially inner tread base radially underneath the tread cap, the tread base comprising a rubber composition comprising
from 15 to 45 phr of styrene-butadiene rubber;
from 20 to 50 phr of polybutadiene; and
from 10 to 35 phr of natural or synthetic polyisoprene, and
from 35 to 65 phr of carbon black, wherein the rolling resistance of the tire is from 1 to 10 percent lower that for an otherwise identical tire not including the tread base.

14 Claims, 3 Drawing Sheets

PNEUMATIC TIRE

FIELD OF THE INVENTION

The present invention is directed towards a pneumatic tire. More specifically, the present invention is directed towards a pneumatic tire demonstrating low rolling resistance while maintaining a satisfactory level of stiffness for handling.

BACKGROUND OF THE INVENTION

Pneumatic tires for passenger cars typically have a symmetrical internal construction; the symmetric being centered on the lateral center, or equatorial plane, of the tire. It is desirable to design pneumatic passenger tires so as to enhance fuel efficiency (minimize rolling resistance) of the vehicle. However, desired improvement in minimizing tire rolling resistance, to be acceptable to the market, must not be at the expense of tire handling performance. While it is known to reduce the mass or weight of a tire in order to reduce the rolling resistance of the tire, achieving low rolling resistance while maintaining handling performance has proven to be problematic.

SUMMARY OF THE INVENTION

The present invention is directed to a tire designed having improved lower rolling resistance and acceptable tire handling performance.

In one aspect of the invention, a pneumatic radial tire having a circumferentially extending equatorial plane of the tire is provided comprising a carcass and a tread radially outward of the carcass. The carcass has at least one carcass reinforcing ply, opposing bead portions, and opposing sidewalls. The carcass reinforcing ply has a main portion extending between the opposing bead portions and a pair of turnup portions. Each turnup portion extends from one end of the main ply portions, each bead portion having a bead core, and a reinforcement cavity outward of each bead core. The cavity is located between the main portion and one turnup portion of the reinforcing ply. A chipper layer is located in the reinforcement cavities in each bead portion of the tire adjacent to the carcass reinforcing ply, the chipper layer being composed of a chopped carbon fiber and aramid composite reinforced elastomeric layer.

In another aspect of the invention, the chipper layer is located adjacent to and axially inward of the carcass reinforcing ply turnup portion and adjacent to and axially outward of the carcass reinforcing ply main portion.

In another aspect of the invention, the chipper layer has a constant thickness along a midsection within a range of 0.005 and 0.015 inches.

In another aspect of the invention, the tire sidewalls have a radial height SH extending from a radially inward end proximate a bead core and extending to a radially outer end proximate the tread, the tire having a section width SW located within a range of 0.4 to 0.44 of the sidewall radial height SH measured from the bead core.

In another aspect of the invention, SW is located within a range of 0.1" to 0.3" inches from a radially outward end of the chipper layer in a radial direction.

In yet a further aspect of the invention, the tread comprises a radially inward first layer formed of a relatively low rolling resistance compound and a radially outward second layer formed of a compound containing silica.

DEFINITIONS

The following definitions are applicable to the present disclosure and are used consistently as defined below:

"Apex" means an elastomeric filler located radially above the bead core and between the plies and the turnup ply.

"Aspect Ratio" means the ratio of its section height to its section width.

"Bead" means that part of the tire comprising an annular tensile member wrapped by ply cords and shaped, with or without other reinforcement elements such as flippers, chippers, apexes, toe guards and chafers, to fit the design rim.

"Belt Structure" or "Reinforcing Belts" means at least two annular layers or plies of parallel cords, woven or unwoven, underlying the tread, unanchored to the bead, and having both left and right cord angles in the range from 17 degrees to 27 degrees with respect to the equatorial plane of the tire.

"Casing" means the carcass, belt structure, beads, sidewalls, and all other components of the tire excepting the tread and undertread. The casing may be unvulcanized rubber or previously vulcanized rubber to be fitted with a new tread.

"Chafers" refers to narrow strips of material placed around the outside of the bead to protect cord plies from the rim, distribute flexing above the rim, and to seal the tire.

"Chipper" refers to a narrow band of fabric or steelcord located in the bead area whose function is to reinforce the bead area and stabilize the lower sidewall "Circumferential" means lines or directions extending along the perimeter of the surface of the annular tread perpendicular to the axial direction.

"Cord" means one of the reinforcement strands of which the plies in the tire are comprised.

"Lateral" means an axial direction.

"Ply" means a continuous layer of rubber-coated parallel cords.

"Radial" and "radially" mean directions radially toward or away from the axis of rotation of the tire.

"Radial Ply Tire" means a belted or circumferentially-restricted pneumatic tire in which the ply cords which extend from bead to bead are laid at cord angles between 65 degrees and 90 degrees with respect to the equatorial plane of the tire.

"Section Height" means the radial distance from the nominal rim diameter to the outer diameter of the tire at its equatorial plane.

"Section Width" ("SW") means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

"Shoulder" means the upper portion of sidewall just below the tread edge, tread shoulder or shoulder rib means that portion of the tread near the shoulder.

"Sidewall" means that portion of a tire between the tread and the bead.

"Tread" means that portion of the tire that comes into contact with the road under normal inflation and load.

"Tread width (TW)" means the arc length of the tread surface in the axial direction, that is, in a plane passing through the axis of rotation of the tire.

BRIEF DESCRIPTION OF THE DRAWINGS

The invention will be described by way of example and with reference to the accompanying drawings in which.

DETAILED DESCRIPTION OF THE INVENTION

The following language is of the best presently contemplated mode or modes of carrying out the invention. This description is made for the purpose of illustrating the general principles of the invention and should not be taken in a limiting sense. The scope of the invention is best determined by reference to the appended claims.

Figure 1:
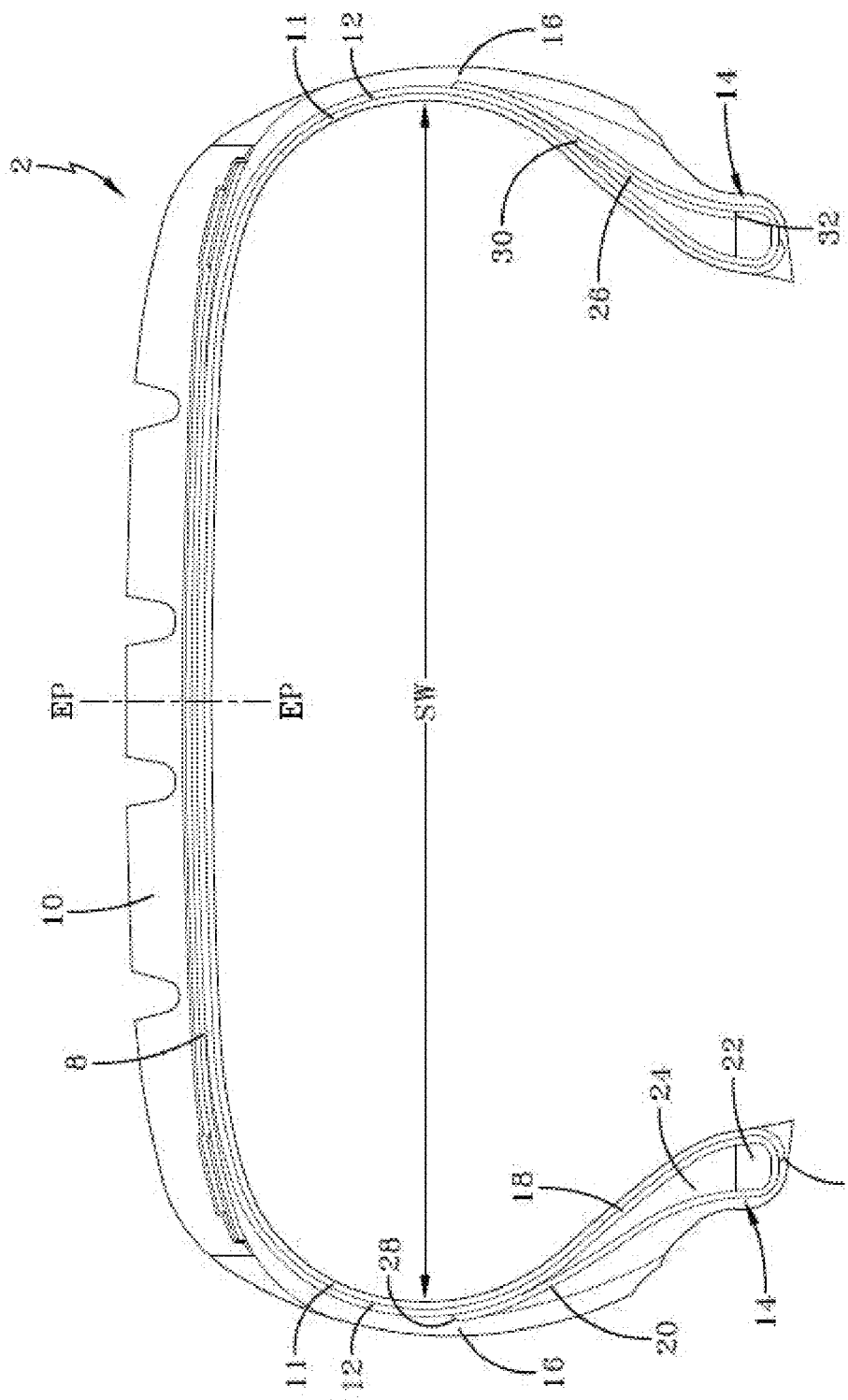
FIG. 1 is a transverse section view of a tire representing the prior art.

FIG. 1 illustrates a tire representative of the prior art. The pneumatic tire 2 is a low aspect radial tire, preferably designed for use as a production passenger tire. The pneumatic tire has a carcass, a belt structure 8 radially outward of the carcass, and a tread 10 radially outward of the belt structure 8. The belt structure 8 may be any of the type conventionally used for a passenger vehicle tire, and generally will include two reinforcement plies of cords with overlay plies covering at least the axially outer edges of the individual belt reinforcement plies.

The carcass has an inner liner 11, at least one carcass reinforcing ply 12, a pair of opposing bead portions 14 and a pair of opposing sidewalls 16. The tire of FIG. 1 is illustrated as having an inner liner 11 and one carcass reinforcing ply, 12, but it is within the skill of those in the art to form the tire of FIG. 1 as a two ply carcass. The ply 12 has a main portion 18 extending through the opposing sidewalls 16 and two turnup portions 20 initiating in the bead portions 14. Each turnup portion 20 of the carcass reinforcing ply 12 extends from the main portion 18 of the carcass reinforcing ply 12, and is wrapped about a bead core 22 and a bead apex 24 in the bead portion 20; thus enveloping, at a minimum, the bead core 22 and the lower portion of the bead apex 24 in each bead portion 14. The turnup portion 20 in the tire of FIG. 1 terminates at a distance radially above or below the maximum section width of the tire.

In the opposing bead portions 14, the bead apexes 24 have generally the same radial height. Bead apexes 24 are typically configured having a dimension of 0.30 inches at the base, 0.16 inches at a mid-point, and 0.075 inches proximate the top. The height of apex 24 may be on the order of 1.46 inches. Placed in one bead portion 14 of the tire is a bead reinforcing layer 26. The bead reinforcing layer 26 may be a chopped carbon fiber reinforced elastomeric layer with a chopped carbon fiber content. In other prior art tires (not shown), conventional chipper plies are formed of textile cords. The use of carbon fiber reinforcement at 26 provides a tensile strength and breaking load strength greater than conventional textile materials.

In the tire shown in FIG. 1, the bead reinforcing layer 26 is located within the turnup envelope and directly adjacent to the bead apex 24. The bead reinforcing layer 26 extends from an initial point 32 near the bead core 22 to a radially outer terminal end 30. The radially inner initial point 32 of the bead reinforcing layer 26 does not have any overlap with the bead core 22, but is spaced from the radially outer surface of the bead core 22; preventing the end 32 of the bead reinforcing layer 26 from being pinched between the bead core 22 and the carcass reinforcing ply 12. The inner liner 11 extends to a lower end 25.

The stiffness of the tire in FIG. 1 may be affected by variations in the tread rubber compound selected for lateral zones across the tire tread 10. If it is desired to increase, or enhance the stiffness of the outboard tread half, the tread rubber, or even just a tread base rubber, may be selected to have a greater hardness or stiffness characteristic than the inboard tread half. If it is desired to equalize the tread half stiffness, the inboard tread half may be the tread portion provided with a tread rubber or tread base rubber with a greater hardness or stiffness characteristic than the outboard tread half. It is known to form the tread 10 from a compound providing desired wet and dry handling characteristics. As the tread 10 wears from use of the tire, the newly exposed material uncovered will be of like material composition and will exhibit the same performance characteristics as the outer surface of the tread 10 prior to tire use.

Figure 2:
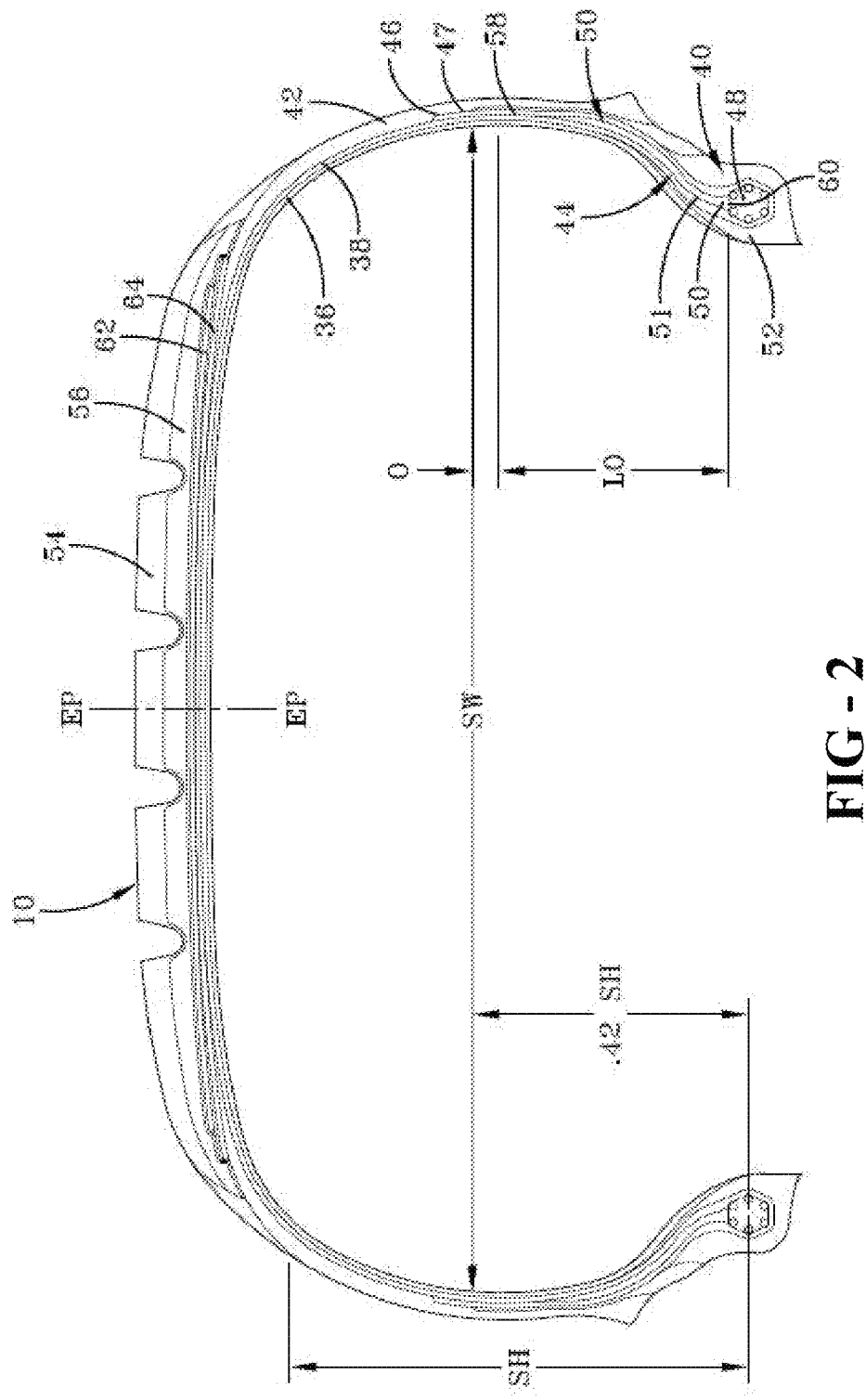
FIG. 2 is a transverse section view of one embodiment of the present invention.

With reference to FIG. 2, a tire 34 exhibiting enhanced low rolling resistance includes a tread 10; a liner 36, a carcass reinforcing ply 38; bead portions (2) 40; and sidewalls (2) 42. The ply 38 has a ply main portion 44 extending radially outward from a bead portion 40. Ply 38 turn up portion 47 extends about a bead core 48 located within the bead portion 40 and terminates at a turn up end 46. A chipper 50 is situated between the ply main portion 44 and the ply turn up portion 47. A chafer 51 is located outward from the turn up portion 47 and is located in the bead portion 40 to resist chafing of the tire from the wheel rim (not shown). The tire inner liner 36 extends to a terminal end 52 located opposite and radially inward of the bead core 48. The tread 10 is configured having a cap layer 54 and an under tread or sub-tread layer 56.

The chipper 50 is an elongate layer situated between the ply turn up portion 47 and the ply main portion 44 and extends from an outer end 58 to an inner end 60. The chipper 50 is preferably although not necessarily formed of an aramid and carbon fiber fabric and replaces a traditional apex to remove gauge, weight, and hysteretic material while maintaining stiffness in the tire for handling. Aramid (Flex 10) Nylon may be utilized. The chipper 50 is formed having a substantially uniform gauge thickness between ends 58, 60. A preferred uniform thickness of 0.030" at all points along the chipper 50 may be employed. The uniform thickness in the chipper and light weight but strong aramid fabric composition of the chipper 50 maintains stiffness for handling while reducing rolling resistance and mass. SW of the tire of FIG. 2 is located at a lower position relative to conventional tires, toward the bead portion 40 of the tire. As shown, the section width SW is within 40 and 44 percent of the sidewall height SH as measured from the bead 48. The relative location of SW toward the bead area in conjunction with the construction (uniform gauge thickness of chipper nominally 0.030 at all points), composition (aramid and carbon fiber composite fabric), and location of the chipper 50 (between the ply main portion 44 and turn up 47) within the bead portion 40 serves to maintain lower sidewall stiffness of the tire for handling. The chipper outer end 58 is preferably located close to the SW of the tire, such as within a distance range "D" of 0.1" to 0.3" inches. Thus, the chipper 50 spans substantially the lower portion of the sidewall from the sidewall SW to the bead core 48, again resulting in a stiffer lower sidewall for handling. The chipper 50 accordingly replaces a traditional apex and thereby reduces the mass of the tire to reduce the tire's rolling resistance while still maintaining lower sidewall stiffness for handling.

The use of a dual layer tread cap compound is employed wherein the radially outer cap 54 has an outer silica based compound layer for good rolling resistance and good wet and dry performance, and a radially inner low rolling resistance base layer 56 underneath the outer compound layer for reducing tire rolling resistance. The base layer is preferably formed of a comparatively stiff compound exhibiting low hysteresis that will contribute to reduce the rolling resistance of the tire. The dual layer tread cap thus reduces tire rolling resistance by material selection and compounding of the tread cap layers while the chipper and lowered SW of the tire contribute to reduce tire rolling resistance in the manner described above.

In order to further reduce rolling resistance, the tire of FIG. 2 is constructed having a relatively narrow tread arc width (TAW); a wider molded base width, and reduced section width SW. The liner 36 may be constructed of one turn of 0.026 inch gauge material, rather than conventional two turns of 0.026 inch material in order to reduce mass and rolling resistance. The chafer 51 gauge may be reduced at a reference point where the toe guard of the tire ends to 0.01 inches rather than conventional 0.07 inches to further reduce mass and rolling resistance. As shown in FIG. 2, the tire has a top belt 62 preferably of 148 mm and a bottom belt 64 of 158 mm to reduce mass and further reduce rolling resistance. The belt angles preferred in the FIG. 2 are 21 degrees for the top and bottom belts 62, 64. The undertread gauges of the tread layer 56 may be 0.06 inches at the centerline of the tread and in the shoulders. The tread base in layer 54 is constructed having a gauge of 0.015 inches. The gauge thicknesses set forth above are intended to be representative of component thicknesses suitable for achieving rolling resistance and handling objectives. The invention, however, is not intended to limited to the gauge described and component gauges may be modified to suit particular tire application constructions.

Following is a chart identifying G' storage modulus value ranges for the prior art FIG. 1 tire components and the FIG. 2 embodiment of the invention. The G' storage modulus value ranges (measured in MPa) for materials used in the identified tire components of the FIG. 2 tire results in the desired reduced rolling resistance.

| PRIOR ART | | | | |
|---|---|---|---|---|
| | Rubber Process RPA G' 1% Max | RPA G' 1% Min | RPA G' 1% Ave | MPa RPA TD 1% RP Max |
| Ply Compound | 1500 | 1000 | 1250 | 0.090 |
| Apex | 23200 | 3000 | 13100 | 0.160 |
| Sidewall | 1800 | 710 | 1255 | 0.200 |
| Belt Treatment | 2900 | 1100 | 2000 | 0.100 |
| Tread Compound | 3200 | 2900 | 3050 | 0.190 |
| Subtread Compound | 3200 | 2900 | 3050 | 0.190 |

| FIG. 2 | | | | |
|---|---|---|---|---|
| | RPA G' 1% Max | RPA G' 1% Min | RPA G' 1% Ave | RPA TD 1% RP Max |
| Ply 12 Compound | 1200 | 960 | 1080 | 0.029 |
| Apex - none | | | | |
| Sidewall 42 | 1000 | 580 | 790 | 0.085 |
| Belt Treatment 62, 64 | 7900 | 4400 | 6150 | 0.281 |
| Tread Compound 54 | 3500 | 2300 | 2900 | 0.116 |
| Subtread Compound 56 | 3800 | 2500 | 3150 | 0.057 |

Figure 3:
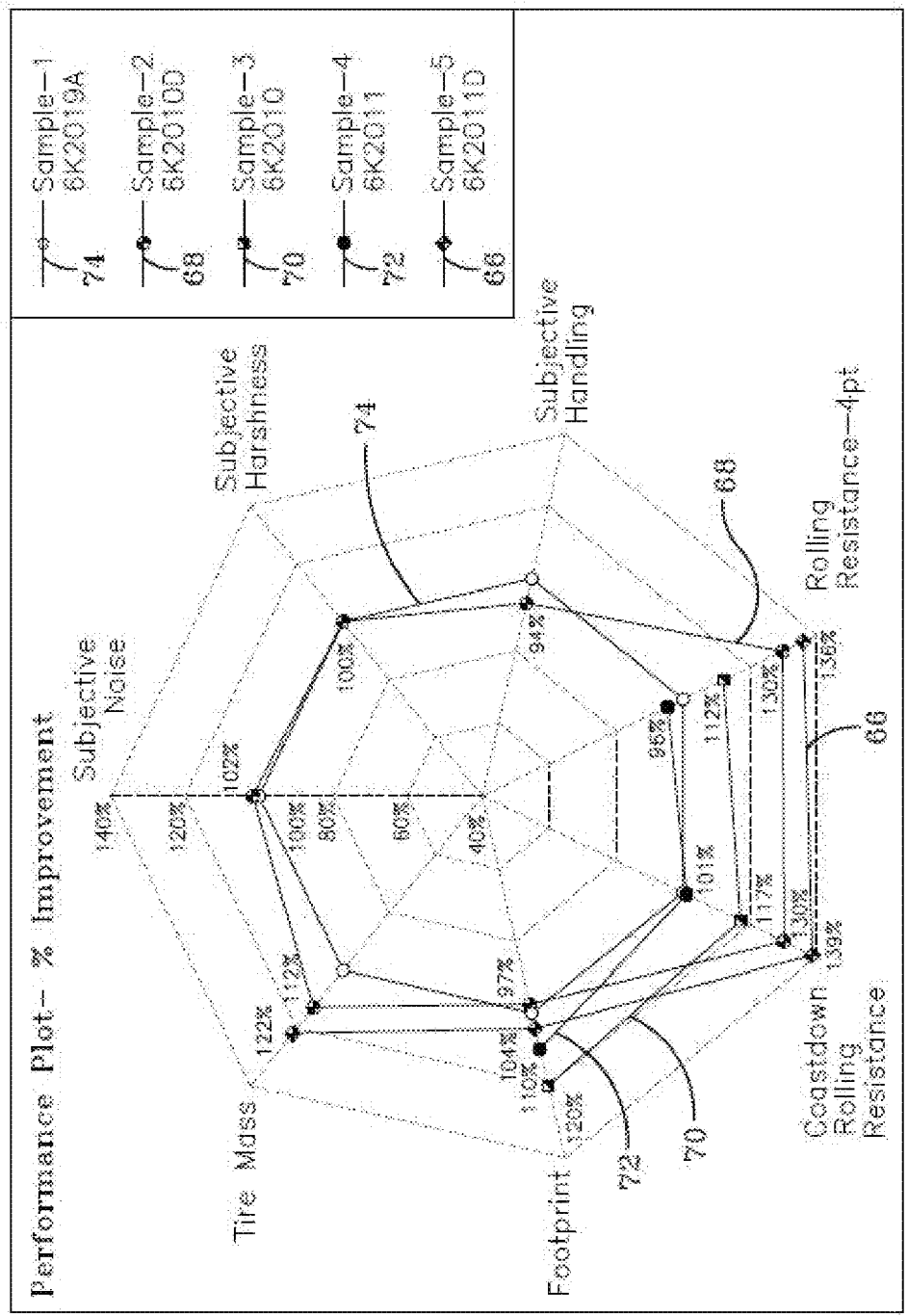
FIG. 3 is a performance plot showing % of improvement of five tire samples; two configured according to the invention and three representing production tires of the prior art.

A performance plot of five samples, showing percentage improvement or degradation in seven tire parameters is shown in FIG. 3. Two samples 66, 68 tires tested were configured as described above and shown in FIG. 2. A rolling resistance improvement of 136% (decrease in rolling resistance) and 139% coastdown rolling resistance for the sample 66 was measured. The footprint of the sample 66 improved (decreased) to 104%; tire mass (decreased) improved 122%. For the sample 68, coastdown rolling resistance improved (decreased) 130%; rolling resistance 130%; subjective handling degraded 94%; subjective harshness remained the same (100%); subjective noise improved (decreased) 102%; tire mass improved 112%; and the footprint degraded 97%. As will be appreciated for both samples 66 and 68 configured pursuant to the invention, significant improvement (decrease) in rolling resistance was achieved without sacrificing performance to a significant degree in tire handling, harshness, noise, and footprint. The other three samples 70, 72, and 74 are based on tires of conventional construction as shown in FIG. 1 and are likewise plotted in FIG. 3.

From the foregoing, it will be noted that a tire configured as shown in FIG. 2 and described above will exhibit an improved lower rolling resistance while handling as required. The effective low weight, low rolling resistance tire of FIG. 2 is both efficient and maintains handling performance as illustrated in FIG. 3. The tire of FIG. 2 results in a 22% lower mass, 39% improvement in lab coastdown rolling resistance and 36% improvement in lab 4 point rolling resistance with near equivalent handling compared to existing production control tires 70, 72, 74.

Again referring to FIG. 2, the base layer 56 is formed of a rubber composition. The rubber composition includes at least one additional diene based rubber. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1, 4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include alkoxy-silyl end functionalized solution polymerized polymers (SBR, PBR, IBR and SIBR), silicon-coupled and tin-coupled star-branched polymers. The preferred rubber or elastomers are natural rubber, synthetic polyisoprene, polybutadiene and SBR.

In one aspect the rubber is preferably of at least two of diene based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers and emulsion polymerization prepared butadiene/acrylonitrile copolymers.

In one embodiment, the rubber composition includes from 15 to 45 phr of styrene-butadiene rubber, from 20 to 50 phr of polybutadiene, and from 10 to 35 phr of natural or synthetic polyisoprene.

In one aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely, a bound styrene content of about 30 to about 45 percent.

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/acrylonitrile copolymer rubbers containing about 2 to about 40 weight percent bound acrylonitrile in the copolymer are also contemplated as diene based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

In one embodiment, cis 1,4-polybutadiene rubber (BR) may be used. Such BR can be prepared, for example, by organic solution polymerization of 1,3-butadiene. The BR may be conveniently characterized, for example, by having at least a 90 percent cis 1,4-content.

The cis 1,4-polyisoprene and cis 1,4-polyisoprene natural rubber are well known to those having skill in the rubber art.

In one embodiment, cis 1,4-polybutadiene rubber (BR) is used. Suitable polybutadiene rubbers may be prepared, for example, by organic solution polymerization of 1,3-butadiene. The BR may be conveniently characterized, for example, by having at least a 90 percent cis 1,4-content and a glass transition temperature Tg in a range of from −95 to −105° C. Suitable polybutadiene rubbers are available commercially, such as Budene® 1207 from Goodyear and the like.

In one embodiment, a synthetic or natural polyisoprene rubber may be used.

A reference to glass transition temperature, or Tg, of an elastomer or elastomer composition, where referred to herein, represents the glass transition temperature(s) of the respective elastomer or elastomer composition in its uncured state or possibly a cured state in a case of an elastomer composition. A Tg can be suitably determined as a peak midpoint by a differential scanning calorimeter (DSC) at a temperature rate of increase of 10° C. per minute.

The term "phr" as used herein, and according to conventional practice, refers to "parts by weight of a respective material per 100 parts by weight of rubber, or elastomer."

The rubber composition may also include up to 70 phr of processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils include various oils as are known in the art, including aromatic, paraffinic, naphthenic, vegetable oils, and low PCA oils, such as MES, TDAE, SRAE and heavy naphthenic oils. Suitable low PCA oils include those having a polycyclic aromatic content of less than 3 percent by weight as determined by the IP346 method. Procedures for the IP346 method may be found in *Standard Methods for Analysis & Testing of Petroleum and Related Products* and *British Standard 2000 Parts*, 2003, 62nd edition, published by the Institute of Petroleum, United Kingdom.

The rubber composition may include from about 50 to about 150 phr of silica. In another embodiment, from 60 to 120 phr of silica may be used.

The commonly employed siliceous pigments which may be used in the rubber compound include conventional pyrogenic and precipitated siliceous pigments (silica). In one embodiment, precipitated silica is used. The conventional siliceous pigments employed in this invention are precipitated silicas such as, for example, those obtained by the acidification of a soluble silicate, e.g., sodium silicate.

Such conventional silicas might be characterized, for example, by having a BET surface area, as measured using nitrogen gas. In one embodiment, the BET surface area may be in the range of about 40 to about 600 square meters per gram. In another embodiment, the BET surface area may be in a range of about 80 to about 300 square meters per gram. The BET method of measuring surface area is described in the *Journal of the American Chemical Society*, Volume 60, Page 304 (1930).

The conventional silica may also be characterized by having a dibutylphthalate (DBP) absorption value in a range of about 100 to about 400, alternatively about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, etc; silicas available from Rhodia, with, for example, designations of Z1165MP and Z165GR and silicas available from Degussa AG with, for example, designations VN2 and VN3, etc.

Commonly employed carbon blacks can be used as a conventional filler in an amount ranging from 10 to 150 phr. In another embodiment, from 20 to 50 phr of carbon black may be used. Representative examples of such carbon blacks include N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP number ranging from 34 to 150 cm$^3$/100 g.

Other fillers may be used in the rubber composition including, but not limited to, particulate fillers including ultra high molecular weight polyethylene (UHMWPE), crosslinked particulate polymer gels including but not limited to those disclosed in U.S. Pat. Nos. 6,242,534; 6,207,757; 6,133,364; 6,372,857; 5,395,891; or 6,127,488, and plasticized starch composite filler including but not limited to that disclosed in U.S. Pat. No. 5,672,639. Such other fillers may be used in an amount ranging from 1 to 30 phr.

In one embodiment the rubber composition may contain a conventional sulfur containing organosilicon compound. Examples of suitable sulfur containing organosilicon compounds are of the formula:

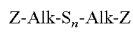

in which Z is selected from the group consisting of

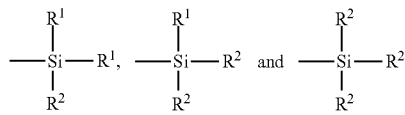

where $R^1$ is an alkyl group of 1 to 4 carbon atoms, cyclohexyl or phenyl; $R^2$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

In one embodiment, the sulfur containing organosilicon compounds are the 3,3'-bis(trimethoxy or triethoxy silylpropyl)polysulfides. In one embodiment, the sulfur containing organosilicon compounds are 3,3'-bis(triethoxysilylpropyl) disulfide and/or 3,3'-bis(triethoxysilylpropyl)tetrasulfide. Therefore, as to formula I, Z may be

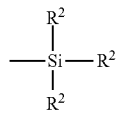

where $R^2$ is an alkoxy of 2 to 4 carbon atoms, alternatively 2 carbon atoms; alk is a divalent hydrocarbon of 2 to 4 carbon atoms, alternatively with 3 carbon atoms; and n is an integer of from 2 to 5, alternatively 2 or 4.

In another embodiment, suitable sulfur containing organosilicon compounds include compounds disclosed in U.S. Pat. No. 6,608,125. In one embodiment, the sulfur containing organosilicon compounds includes 3-(octanoylthio)-1-propyltriethoxysilane, $CH_3(CH_2)_6C(\!=\!\!O)\!-\!\!S\!-\!\!CH_2CH_2CH_2Si(OCH_2CH_3)_3$, which is available commercially as NXT™ from Momentive Performance Materials.

In another embodiment, suitable sulfur containing organosilicon compounds include those disclosed in U.S. Patent Publication No. 2003/0130535. In one embodiment, the sulfur containing organosilicon compound is Si-363 from Degussa.

The amount of the sulfur containing organosilicon compound in a rubber composition will vary depending on the level of other additives that are used. Generally speaking, the amount of the compound will range from 0.5 to 20 phr. In one embodiment, the amount will range from 1 to 10 phr.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide including alkylphenol polysulfides and sulfur olefin adducts. In one embodiment, the sulfur-vulcanizing agent is elemental sulfur. The sulfur-vulcanizing agent may be used in an amount ranging from 0.5 to 8 phr, alternatively with a range of from 1.5 to 6 phr. Typical amounts of tackifier resins, if used, comprise about 0.5 to about 10 phr, usually about 1 to about 5 phr. Typical amounts of processing aids comprise about 1 to about 50 phr. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), pages 344 through 346. Typical amounts of antiozonants comprise about 1 to 5 phr. Typical amounts of fatty acids, if used, which can include stearic acid comprise about 0.5 to about 3 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, alternatively about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be a guanidine, dithiocarbamate or thiuram compound. Suitable guanidines include dipheynylguanidine and the like. Suitable thiurams include tetramethylthiuram disulfide, tetraethylthiuram disulfide, and tetrabenzylthiuram disulfide.

The mixing of the rubber composition can be accomplished by methods known to those having skill in the rubber mixing art. For example, the ingredients are typically mixed in at least two stages, namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions, and the volume and nature of the components. For example, the thermomechanical working may be from 1 to 20 minutes.

The rubber composition may be incorporated in a variety of rubber components of the tire. For example, the rubber component may be a tread (including tread cap and tread base), sidewall, apex, chafer, sidewall insert, wirecoat or innerliner. In one embodiment, the component is a tread.

The pneumatic tire of the present invention may be a race tire, passenger tire, aircraft tire, agricultural, earthmover, off-the-road, truck tire, and the like. In one embodiment, the tire is a passenger or truck tire. The tire may also be a radial or bias.

Vulcanization of the pneumatic tire of the present invention is generally carried out at conventional temperatures ranging from about 100° C. to 200° C. In one embodiment, the vulcanization is conducted at temperatures ranging from about 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

The invention is further illustrated by the following non-limiting examples.

EXAMPLE 1

In this example, a rubber composition useful as a low rolling resistance subtread is illustrated. A rubber compound was prepared following a two-step mixing procedure as shown in Table 1, with all amounts in phr.

The rubber composition was evaluated for various physical properties, as shown in Table 2.

TABLE 1

| Component | Amount in phr |
|---|---|
| Non-Productive Mix Step | |
| Styrene-butadiene rubber | 36.75 |
| Polybutadiene rubber | 36.75 |
| Natural rubber | 26.5 |
| Carbon Black | 56 |
| Antioxidants | 3 |
| Zinc Oxide | 5 |
| Stearic Acid | 0.5 |
| Productive Mix Step | |
| Antioxidant | 1 |
| Sulfenamide accelerator | 6.6 |
| Sulfur | 4 |
| Phthalimide inhibitor | 0.3 |
| Alkylphenol disulfide | 5.5 |

TABLE 2

| Rheometer MDR (Test at 150° C.) | |
|---|---|
| Minimum torque (dNm) | 2.44 |
| Maximum torque (dNm) | 40.82 |
| Delta torque (dNm) | 38.38 |
| T25 (minutes) | 6.34 |
| T90 (minutes) | 12.14 |
| RPA (measured at 100° C.) | |
| G' uncured at 0.83 Hz, 15% strain (MPa) | 0.22 |
| G' at 5% strain, 1 Hz (MPa) | 2.86 |
| G" at 5% strain, 1 Hz (MPa) | 0.166 |
| Tan Delta at 5% strain, 1 Hz | 0.058 |

TABLE 2-continued

| ATS Tensile | |
|---|---|
| 100% Modulus (MPa) | 5.9 |
| 150% Modulus (MPa) | 11.2 |
| Tensile at break (MPa) | 11.9 |
| Elongation at break (%) | 173 |
| Shore A Hardness, room temp | 77.2 |
| Shore A Hardness, 100° C. | 76.2 |
| Rebound, room temp | 75 |
| Rebound, 100° C. | 83.8 |
| DIN abrasion (cured 6 minutes at 170° C.) | |
| Relative volume loss, mm | 188 |
| ARES Temperature Sweep at 3% strain, cured 6 minutes at 170° C. | |
| G' at 0° C. (MPa) | 4.01 |
| G" at 0° C. (MPa) | 0.373 |
| Tan delta at 0° C. | 0.093 |
| G' at 30° C. (MPa) | 3.82 |
| G" at 30° C. (MPa) | 0.219 |
| Tan delta at 30° C. (MPa) | 0.057 |
| G' at 60° C. (MPa) | 3.84 |
| G" at 60° C. (MPa) | 0.164 |
| Tan delta at 60° C. (MPa) | 0.043 |

EXAMPLE 2

In this example, the effect of the use of the compound of Example 1 in a subtread is illustrated. Two P205/55R16 tires were constructed, the first tire using standard materials and the second tire identical to the first except for the addition of a subtread using the compound of Example 1. The tires were evaluated for rolling resistance using a standard ISO _____ test at a load of 895 lbs, inflation pressure of 37.9 psi and speed of 50 MPH. The results of the rolling resistance tests showed that the second tire had an approximately 4 percent reduction in rolling resistance as compared with the first.

EXAMPLE 3

In the example, the effect of the use of the compound of Example 1 in a subtread is further illustrated. Two P205/55R16 tires were constructed, the first tire using standard materials and the second tire identical to the first except for the addition of a subtread using the compound of Example 1. The tires were evaluated for rolling resistance using a coast-down test. The results of the rolling resistance tests showed that the second tire had an approximately 6.1 percent reduction in rolling resistance as compared with the first.

In one embodiment, the tire having the low rolling resistance subtread will have reduction in rolling resistance ranging from 1 to 10 percent compared to an otherwise identical tire without the subtread.

In one embodiment, the tire having the low rolling resistance subtread will have reduction in rolling resistance ranging from 2 to 8 percent compared to an otherwise identical tire without the subtread.

What is claimed is:

1. A pneumatic radial tire of the type having a circumferentially extending equatorial plane of the tire, the tire comprising a carcass, a tread radially outward of the carcass, the carcass comprising at least one carcass reinforcing ply, opposing bead portions, and opposing sidewalls, the carcass reinforcing ply having a main portion extending between the opposing bead portions and a pair of turnup portions, each turnup portion extending from one end of the main portion, each bead portion having a bead core, and a reinforcement cavity outward of each bead core, the cavity located between the main portion and one turnup portion of the at least one reinforcing ply, the tire characterized by:
  the reinforcement cavities being apex-less and having a dimension and configuration for close receipt of a chipper layer therein, each reinforcement cavity situated between a ply turnup tire portion and ply main portion and having a substantially constant width along a chipper layer-receiving midsection;
  a chipper layer located in each of the reinforcement cavities in each bead portion of the tire and adjacent to the at least one carcass reinforcing ply wherein the chipper layer is a chopped carbon fiber and aramid composite reinforced elastomeric layer;
  the tread comprising a radially outer tread cap and a radially inner tread base radially underneath the tread cap, the tread base comprising a rubber composition comprising
  100 phr of an elastomer consisting of:
  from 15 to 45 phr of styrene-butadiene rubber;
  from 20 to 50 phr of cis 1,4-polybutadiene; and
  from 10 to 35 phr of natural or synthetic polyisoprene; and
  from 35 to 65 phr of carbon black.

2. The tire of claim 1 wherein the chipper layer is located adjacent to and axially inward of the carcass reinforcing ply turnup portion.

3. The tire of claim 1 wherein the chipper layer is located adjacent to and axially outward of the carcass reinforcing ply main portion.

4. The tire of claim 1 wherein the chipper layer has a thickness within a range of 0.005 and 0.015 inches.

5. The tire of claim 4 wherein the chipper layer has a substantially constant thickness along a chipper layer midsection extending between a radially outward chipper layer end and a radially inward chipper layer end adjacent to the bead core.

6. The tire of claim 5, wherein the chipper layer is situated between the carcass ply main portion and turnup portion and the carcass comprises a single carcass reinforcing ply.

7. The tire of claim 1 wherein the tire sidewalls having a radial height SH extending from an radially inward end proximate a bead core and extending to a radially outer end proximate the tread, the tire having a section width SW located within a range of 0.4 to 0.44 of the sidewall radial height from the bead core.

8. The tire of claim 7, wherein the SW is located within a range of 0.1" to 0.3" inches from the radially outward end of the chipper layer in a radial direction.

9. The tire of claim 1 wherein the tire sidewalls having a radial height SH extending from a radially inward end proximate a bead core and extending to a radially outer end proximate the tread first layer, the tire having a section width SW located within a range of 0.6 to 0.56 of the sidewall radial height from the tread first layer.

10. The tire of claim 9, wherein the SW is located within a range of 0.1" to 0.3" inches from the radially outward end of the chipper layer in a radial direction.

11. The tire of claim 10, wherein the chipper layer has a substantially constant thickness along a chipper layer midsection within a range of 0.005 and 0.015 inches.

12. The tire of claim 1, wherein the rolling resistance of the tire is from 1 to 10 percent lower that for an otherwise identical tire not including the tread base.

13. A pneumatic radial tire having a circumferentially extending equatorial plane of the tire, the tire comprising a carcass, a tread radially outward of the carcass, the carcass comprising at least one carcass reinforcing ply, opposing bead portions, and opposing sidewalls, the carcass reinforcing ply having a main portion extending between the opposing bead portions and a pair of turnup portions, each turnup portion extending from one end of the main portion, each bead portion having a bead core, and a reinforcement cavity outward of each bead core configured, the cavity located between the main portion and one turnup portion of the at least one reinforcing ply, the tire characterized by:
  the reinforcement cavities being apex-less and having a dimension and configuration for close receipt of a chipper layer therein, each reinforcement cavity situated between a ply turnup tire portion and ply main portion and having a substantially constant width along a chipper layer-receiving midsection;
  a chipper layer located in each of the reinforcement cavities in each bead portion of the tire and adjacent to the at least one carcass reinforcing ply wherein the chipper layer is a chopped carbon fiber and aramid composite reinforced elastomeric layer;
  wherein each chipper layer within a reinforcement cavity has a radially inward end centered with and radially outward from a bead core within each bead portion of the tire; and
  the tread comprising a radially outer tread cap and a radially inner tread base radially underneath the tread cap, the tread base comprising a rubber composition comprising
  100 phr of an elastomer consisting of:
    from 15 to 45 phr of styrene-butadiene rubber;
    from 20 to 50 phr of cis 1,4-polybutadiene; and
    from 10 to 35 phr of natural or synthetic polyisoprene; and
  from 35 to 65 phr of carbon black.

14. The tire of claim 13, wherein the rolling resistance of the tire is from 1 to 10 percent lower that for an otherwise identical tire not including the tread base.

* * * * *